United States Patent
Gilmore

(10) Patent No.: US 8,534,439 B2
(45) Date of Patent: Sep. 17, 2013

(54) ELECTROMECHANICAL ACTUATOR FOR FRICTION CLUTCHES

(75) Inventor: Curt D. Gilmore, Fenton, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 999 days.

(21) Appl. No.: 12/130,546

(22) Filed: May 30, 2008

(65) Prior Publication Data
US 2009/0294238 A1    Dec. 3, 2009

(51) Int. Cl.
*F16D 13/26* (2006.01)
*F16D 27/115* (2006.01)

(52) U.S. Cl.
USPC ............ 192/70.23; 192/84.7; 192/93 B

(58) Field of Classification Search
USPC .......... 192/84.7, 84.9, 93 B, 70.29, 70.3, 192/70.24
See application file for complete search history.

(56) References Cited

U.S. PATENT DOCUMENTS

| | | | |
|---|---|---|---|
| 647,436 A * | 4/1900 | Beck | 318/367 |
| 840,742 A * | 1/1907 | Benn | 192/70.3 |
| 1,460,303 A * | 6/1923 | Wood | 192/66.23 |
| 1,622,939 A * | 3/1927 | Bing | 192/84.91 |
| 2,072,832 A | 3/1937 | Weydell | |
| 2,276,276 A * | 3/1942 | Livingston | 192/70.2 |
| 2,380,571 A * | 7/1945 | Barron | 192/70.251 |
| 2,490,398 A * | 12/1949 | Aschauer | 192/70.251 |
| 2,613,777 A | 10/1952 | Carlson | |
| 2,626,032 A | 1/1953 | De Coursey | |
| 2,667,253 A | 1/1954 | Sherman | |
| 2,815,839 A | 12/1957 | Binder | |
| 3,009,553 A | 11/1961 | Henyon | |
| 3,072,235 A | 1/1963 | Aschauer | |
| 3,312,319 A | 4/1967 | Carroll et al. | |
| 3,400,610 A | 9/1968 | Taylor et al. | |
| 3,507,374 A | 4/1970 | Allaben, Jr. | |
| 4,391,356 A | 7/1983 | Takemura et al. | |
| 4,865,173 A | 9/1989 | Leigh-Monstevens et al. | |

(Continued)

FOREIGN PATENT DOCUMENTS

JP    53024944 A    3/1978

OTHER PUBLICATIONS

"New Electronically Controlled Torque Split 4WD System for Improving Cornering Performance," Naito, et al., SAE Technical Paper Series 900556, International Congress and Exposition, Feb. 26-Mar. 2, 1990, 12 pages, © 1990 Society of Automotive Engineers, Inc.

*Primary Examiner* — David D Le
*Assistant Examiner* — Ryan Dodd
(74) *Attorney, Agent, or Firm* — Harness, Dickey & Pierce, P.L.C.

(57) ABSTRACT

A friction clutch assembly selectively engages an input member and an output member to allow selective transfer of torque therebetween. The friction clutch assembly includes a clutch pack including a first clutch member operatively coupled to the input member and a second clutch member operatively coupled to the output member. The clutch assembly further includes a plurality of lever arms and an actuating member with a movable member that is movably disposed between the plurality of lever arms. The movable member is movable generally along a linear axis between a disengaged position and an engaged position, and the movable member cams the plurality of lever arms relative to linear axis to cause the first and second clutch members to engage when the movable member moves to the engaged position. The first and second clutch members disengage when the movable member moves to the disengaged position.

8 Claims, 3 Drawing Sheets

(56) References Cited

U.S. PATENT DOCUMENTS

Figure 1:
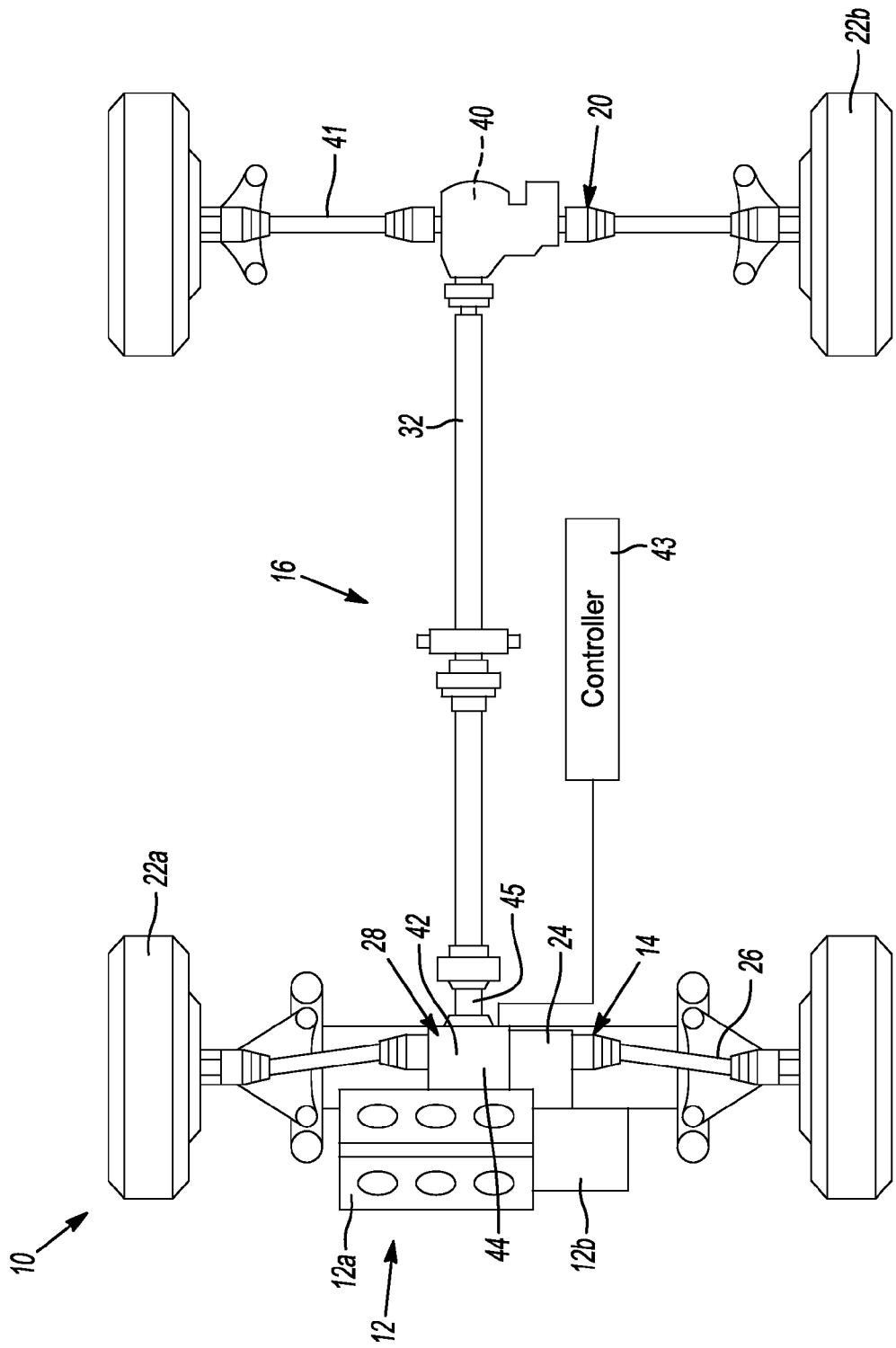

| | | |
|---|---|---|
| 4,895,236 A | 1/1990 | Sakakibara et al. |
| 4,936,428 A | 6/1990 | Leigh-Monstevens et al. |
| 5,332,060 A | 7/1994 | Sperduti et al. |
| 5,533,603 A | 7/1996 | Terranova et al. |
| 5,562,192 A | 10/1996 | Dick |
| 5,593,015 A | 1/1997 | Kosumi et al. |
| 5,833,041 A | 11/1998 | Hashimoto et al. |
| 5,979,629 A | 11/1999 | Asada et al. |
| 6,378,680 B2 | 4/2002 | Rohs et al. |
| 6,398,686 B1 | 6/2002 | Irwin |
| 6,405,822 B1 | 6/2002 | Lee et al. |
| 6,598,721 B2 | 7/2003 | Schmidl |
| 6,766,889 B1 | 7/2004 | Pennycuff |
| 6,780,132 B2 | 8/2004 | Cook et al. |
| 6,805,228 B2 | 10/2004 | Szadkowski et al. |
| 6,808,052 B2 | 10/2004 | Kirkwood et al. |
| 6,835,156 B2 | 12/2004 | Lippitsch |
| 6,997,294 B2 | 2/2006 | Ochiai et al. |
| 7,104,379 B2 | 9/2006 | Puiu |
| 7,325,664 B2 | 2/2008 | Fusegi |
| 2004/0050643 A1 | 3/2004 | Krzesicki et al. |
| 2004/0231944 A1 | 11/2004 | Dolan |

\* cited by examiner

ELECTROMECHANICAL ACTUATOR FOR FRICTION CLUTCHES

FIELD

The present disclosure relates to a friction clutch assembly and, more particularly, relates to an electromechanical actuator for a friction clutch assembly.

BACKGROUND

The statements in this section merely provide background information related to the present disclosure and may not constitute prior art.

Friction clutch assemblies are often used to selectively transfer torque between an input member and an output member. For instance, some vehicles include a selective torque transfer device (e.g., a limited slip differential) for selectively coupling a rotating input shaft and an output shaft. The clutch assembly selectively engages to transfer torque between the input shaft and the output shaft and selectively disengages to disengage the input and output shafts.

Many conventional clutch assemblies include a plurality of input clutch plates that are coupled to the input member and a plurality of output clutch plates that are coupled to the output member. The input and output clutch plates are alternatingly arranged (i.e., interleaved). The clutch assembly also includes an actuator such as a mechanical or hydraulic actuator that can be actuated by a control system between a disengaged and an engaged position. The control system causes the actuator to move from the disengaged position, in which the input and output clutch plates are spaced away from each other, to the engaged position, in which the input and output clutch plates engage to thereby transfer torque between the input and output members.

Other conventional clutch assemblies include a plate operatively coupled to an input member and a corresponding plate operatively coupled to the output member. The plates each include a ramp, and a ball is disposed between the plates in the space defined between the corresponding ramps. In a disengaged position, the input and output members can rotate relative to each other; however, in an engaged position, the ball rolls in the ramps and locks the input and output members for torque transfer.

These conventional clutch assemblies can have certain disadvantages. For instance, these conventional clutch assemblies can display a relatively slow response time. In other words, there is substantial latency when engaging these conventional clutch assemblies.

Moreover, control of these clutch assemblies can be inadequate. For instance, many of these clutch assemblies can be configured only in the engaged and disengaged position, with little control of the clutch assembly as it moves between the engaged and disengaged positions. As such, engagement of the input and output members can be abrupt and noisy.

In addition, conventional clutch assemblies can be relatively complex and can include a substantial number of components, which increases cost of the assembly. Furthermore, these clutch assemblies can be relatively bulky.

SUMMARY

A friction clutch assembly is disclosed that selectively engages an input member and an output member to allow selective transfer of torque therebetween. The friction clutch assembly includes a clutch pack including a first clutch member operatively coupled to the input member and a second clutch member operatively coupled to the output member. The clutch assembly further includes a plurality of lever arms and an actuating member with a movable member that is movably disposed between the plurality of lever arms. The movable member is movable generally along a linear axis between a disengaged position and an engaged position, and the movable member cams the plurality of lever arms relative to linear axis to cause the first and second clutch members to engage when the movable member moves to the engaged position. The first and second clutch members disengage when the movable member moves to the disengaged position.

In another aspect, a method of configuring a friction clutch assembly is disclosed for selectively engaging an input member and an output member to allow selective transfer of torque therebetween. The method includes providing a clutch pack including a first clutch member operatively coupled to the input member and a second clutch member operatively coupled to the output member. The method also includes providing a plurality of lever arms and providing an actuating member with a movable member that is movably disposed between the plurality of lever arms along a linear axis between a disengaged position and an engaged position. Furthermore, the method includes actuating the movable member along the linear axis from the disengaged position to the engaged position to cam the plurality of lever arms relative to the linear axis to cause the first and second clutch members to engage. Additionally, the method includes actuating the movable member along the linear axis from the engaged position to the disengaged position, causing the first and second clutch members to disengage.

In still another aspect, a friction clutch assembly is disclosed that selectively engages an input member and an output member to allow selective transfer of torque therebetween. The friction clutch assembly includes a clutch pack including a plurality of first clutch plates operatively coupled to the input member and a plurality of second clutch plates operatively coupled to the output member. The first clutch plates and the second clutch plates are alternatingly arranged. The friction clutch assembly also includes a plurality of lever arms, each having a first portion, a second portion disposed at a positive angle relative to the first portion, and a pivot member disposed between the first and second portion. The pivot member pivotally supports the respective lever arm. The clutch assembly further includes an actuating member with a movable member that is movably disposed between the plurality of lever arms along a linear axis between a disengaged position and an engaged position. The movable member includes a cam surface that cams the first portion of the plurality of lever arms away from the linear axis to cause the second portion of the lever arm to abut the clutch pack to engage the plurality of first and second clutch plates when the movable member actuates to the engaged position. The first and second clutch plates disengage when the movable member actuates to the disengaged position. The cam surface includes a first axial end and a second axial end that is closer to the clutch pack than the first axial end. Also, the cam surface is wider adjacent the second axial end as compared to the first axial end.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2A:
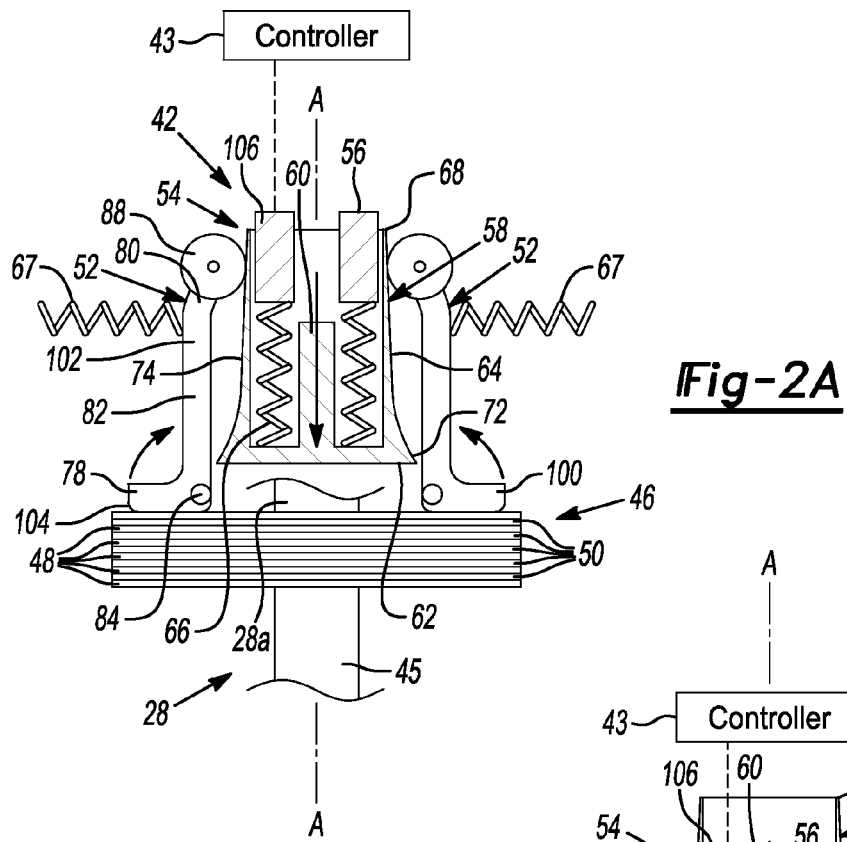
Figure 2B:
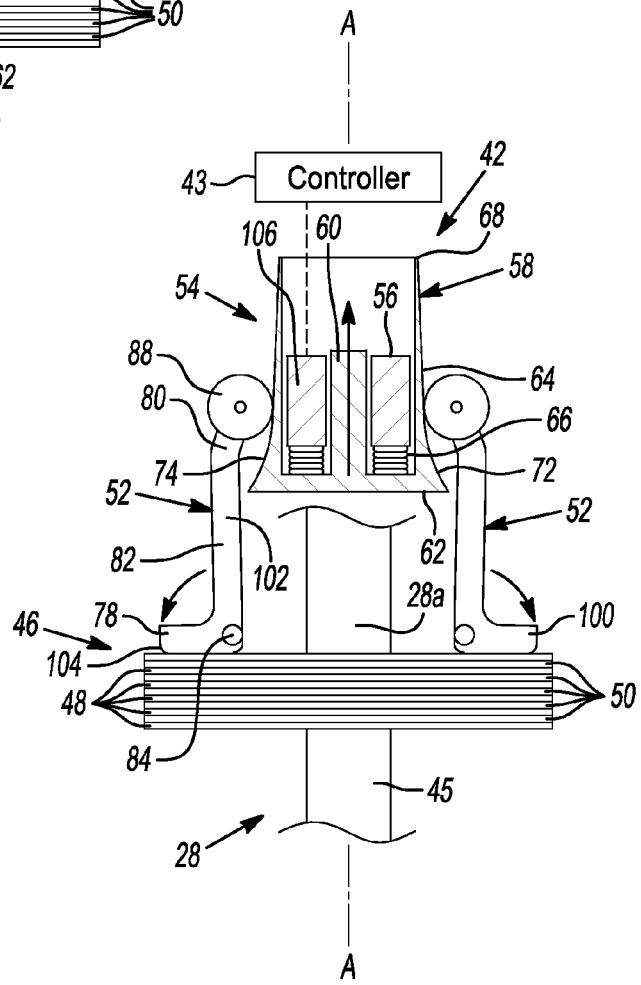
Figure 3A:
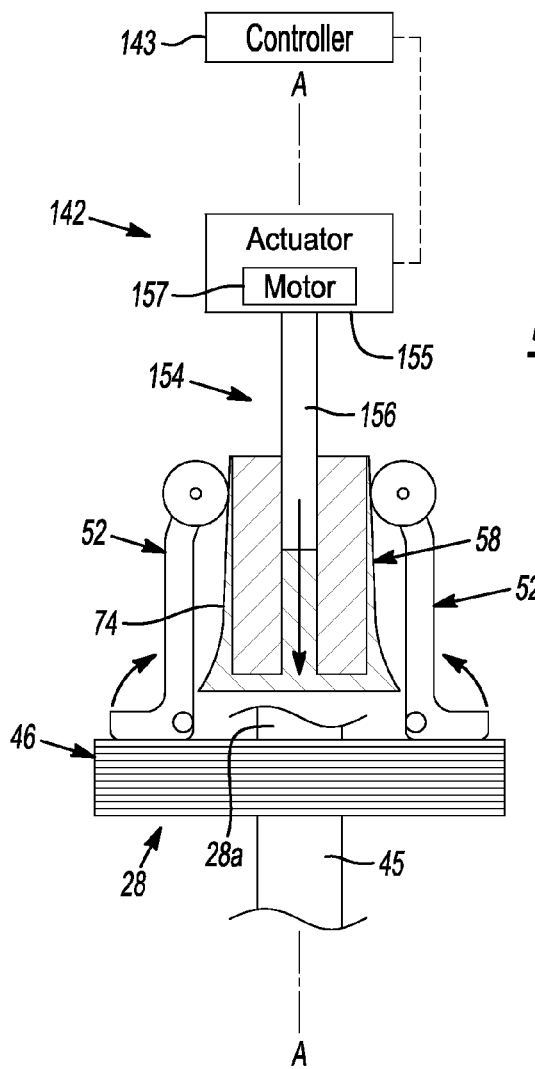
Figure 3B:
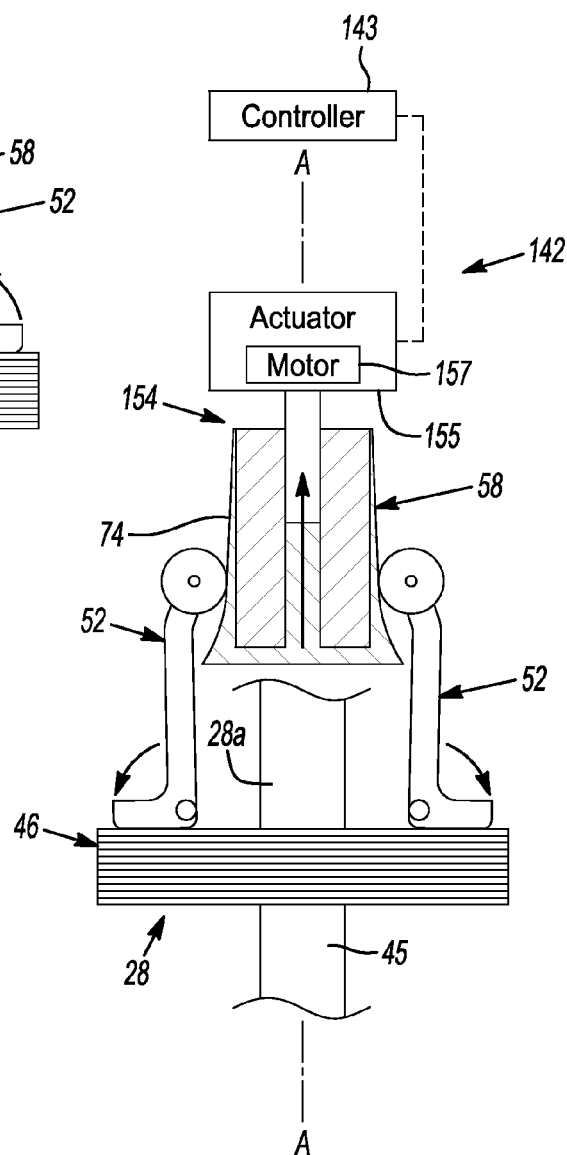

FIG. 1 is a schematic view of a vehicle with a friction clutch assembly constructed in accordance with the teachings of the present disclosure;

FIGS. 2A and 2B are schematic views of the friction clutch assembly of FIG. 1, wherein FIG. 2A illustrates the friction clutch assembly in a disengaged position and FIG. 2B illustrates the friction clutch assembly in an engaged position; and FIGS. 3A and 3B are schematic views of another friction clutch assembly constructed in accordance with the teachings of the present disclosure, wherein FIG. 3A illustrates the friction clutch assembly in a disengaged position and FIG. 3B illustrates the friction clutch assembly in an engaged position.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle constructed in accordance with the teachings of the present disclosure is generally indicated by reference numeral 10. The vehicle 10 can include a powertrain 12, a first or primary driveline 14 and a second or secondary driveline 16. The powertrain 12 can include an engine 12a and a transaxle 12b that can be arranged to provide motive power (i.e., drive torque) to a pair of wheels 22a associated with the primary driveline 14. The primary driveline 14 can include a differential assembly 24 and a pair of shafts 26 that can be employed to couple the wheels 22a to the differential 24. The secondary driveline 16 can include a power take-off unit 28, a propshaft 32, a differential 40 and a pair of shafts 41 that can couple the differential 40 to a pair of wheels 22b associated with the secondary driveline 16. The power take-off unit 28 can be driven by the transaxle 12b and can be employed to selectively distribute drive torque to the differential 40 via the propshaft 32 to drive the wheels 22b.

The power take-off unit 28 can include a friction clutch assembly 42 and an associated controller 43. The controller 43 can include circuitry, programmed logic, computer memory, and the like. Also, the controller 43 can be independent or the controller 43 can be incorporated with other vehicle controllers (not shown) that control other subsystems of the vehicle 10.

The friction clutch assembly 42 is operatively coupled to the power take-off unit 28. More specifically, the friction clutch assembly 42 is enclosed in a housing 44 of the power take-off unit 28 and is selectively operable for coupling an intermediate member 28a (FIG. 2A), which serves as an input member, to an output member 45 to transmit rotary power therebetween. It will be appreciated that rotary power transmitted to the output member 45 is received by the propshaft 32 and transmitted to the differential 40. Thus, under certain conditions, such as when the vehicle 10 is traveling on a low-traction surface, the friction clutch assembly 42 can be selectively engaged to facilitate an effective transfer of drive torque to the wheels 22b.

While the friction clutch assembly 42 is illustrated and described herein as being associated with the power take-off unit 44, it will be appreciated that the friction clutch assembly 42 could be employed in any torque transmitting device where there is a need to selectively control the transmission of rotary power between two components (including the components of a differential).

Referring now to FIGS. 2A and 2B, the friction clutch assembly 42 is illustrated without the housing 44 (FIG. 1) for purposes of clarity. The friction clutch assembly 42 can include clutch pack generally indicated at 46. The clutch pack 46 can include a plurality of first clutch members 48 and a plurality of second clutch members 50. The first and second clutch members 48, 50 can be plate-like structures that can be formed of a desired material and alternatingly arranged (i.e., interleaved) in the clutch pack 46. In some embodiments, the first and second clutch members 48, 50 can be immersed in a fluid, such as oil (not shown) and a pressure plate (not shown) can be employed to transmit force to the first clutch members 48.

The first clutch members 48 can be operatively coupled to the intermediate shaft 28a of the power take-off unit 28, while the second clutch members 50 can be operatively coupled to the output shaft 45 of the power take-off unit 28. The first clutch members 48 are moveable in an axial direction (i.e., along the axis A) relative to the second clutch members 50. Thus, the clutch pack 46 can be positioned in a fully disengaged condition (FIG. 2A), wherein the first clutch members 48 are spaced from the second clutch members 50 such that torque is not transferred between the intermediate shaft 28a and the output shaft 45, and a fully engaged condition (FIG. 2B), wherein the first and second clutch members 48, 50 are frictionally engaged to one another to facilitate the transfer of drive torque between the intermediate shaft 28a and the output shaft 45. In some embodiments, the clutch pack 46 can also be partially engaged, wherein the first and second clutch members 48, 50 are partially moved toward each other, and some degree of torque transfer occurs therebetween.

In some embodiments, the clutch pack 46 includes a biasing member (not shown) for biasing the first and second clutch members 48, 50 away from each other.

The friction clutch assembly 42 can also include a plurality of lever arms 52, an actuator assembly 54, which can be in communication with the controller 43, and a plurality of arm springs 67. Each of the lever arms 52 can be pivotally coupled to the housing 44 (FIG. 1) via a pin 84 and can include a pressing member 78, which can be disposed adjacent the clutch pack 46, and a follower 88, such as a roller, that can be disposed adjacent the actuator assembly 54. In the particular example provided, each lever arm 52 includes a generally L-shaped arm member having a base 100, which can form or be coupled to the pressing member 78, and a leg 102 that can form or be coupled to the follower 88. In the example provided, the base 100 includes an arcuate end face 104 that can be moved into direct contact with the clutch pack 46 to move the first clutch members 48 toward or into the fully engaged condition. It will be appreciated, however, that the pressing member 78 could include a roller and be rotatably coupled to the base 100. The leg 102 can be an elongate member and can include a first portion 80 and a second portion 82 that can be disposed between the first portion 80 and the base 100. The follower 88 can be coupled to an end of the first portion 80 opposite the second portion 82. The first portion 80 can be disposed relative to the second portion 82 to provide clearance for the actuator assembly 54. In the example provided, an included angle between the first portion 80 and the second portion 82 is an obtuse angle.

The actuator assembly 54 can include a linear actuator 106, such as a solenoid, a linear motor or a ball screw, a movable member 58 and a biasing member 66. The linear actuator 106 can include a coil 56, which can be fixed to the housing 44 (FIG. 1) and an armature 60 that can be formed of a magnetic material, such as ferromagnetic steel, and coupled to the movable member 58.

The movable member 58 can be a hollow member that can include a generally bell-shaped wall or cam surface 74, which can be engaged to the followers 88, and an end face 62. The cam surface 74 can include a first wall portion 64 and a second wall portion 72. The first wall portion 64 can have a surface is defined by a slope (or a series of slopes) that change in a relatively gradual manner. For example, the first wall portion 64 can taper outwardly with decreasing distance from the end face 62 at a first rate. The second wall portion 72 can have a surface that is defined by a slope (or a series of slopes) that change in a relatively quick manner. For example, the second wall portion 72 can taper outwardly with decreasing distance from the end face 62 at a second rate that is greater than the first rate. The first and second rates can be defined by any desired function, such as a linear, an exponential, a geometric function and combinations thereof.

The biasing member 66 can be configured to bias the armature 60 (and the movable member 58) away from the coil 56 into the disengaged position. In the example provided, the biasing member 66 is a helical coil spring that is received in the hollow center 68 of the movable member 58 and disposed about the armature 60.

The arm springs 67 can be received in the housing 44 (FIG. 1) and can bias the lever arms 52 toward the actuator assembly 54 such that the followers 88 are maintained in contact with the cam surface 74.

The controller 43 can be configured to generate a signal to operate the coil 56. For example, the controller 43 can transmit electrical power directly to the coil 56 to cause the coil 56 to generate a magnetic field that can move the armature 60 (and the movable member 58) along the axis A. Accordingly, it will be appreciated that the controller 43 can be employed to cause the movable member 58 to be moved between a first position, which is illustrated in FIG. 2A, and a second position that is illustrated in FIG. 2B to cause the clutch pack 46 to be operated in the disengaged condition and the engaged condition, respectively. It will be appreciated, too, that the controller 43 could be employed to control an amount of power that is provided to the coil 56. For example, the controller 43 can transmit power having a first voltage to the coil 56 in some instances, but can transmit power having second, higher voltage to the coil 56 in other instances when relatively faster operation of the actuator assembly 54 and/or higher force output from the linear actuator 106 is desired.

Under certain predetermined conditions, e.g., slippage of the wheels 22a (FIG. 1), the controller 43 can cause the coil 56 to be energized such that the coil 56 creates a magnetic field. The magnetic field can attract the armature 60 to cause the moveable member 58 to slide along the axis A toward the coil 56 (FIG. 2B) against the biasing force provided by the biasing member 66. As the moveable member 58 moves in this direction, the followers 88 of the lever arms 52 cam against the cam surface 74, and the first portion 76 of the lever arms 52 pivot about their respective pivot pins 84 away from the axis A against the biasing force of the biasing member 67. As a result, the pressing member 78 can be progressively driven into the clutch pack 46 to increasingly apply force to the clutch pack 46 and bring the first and second clutch members 48, 50 into engagement.

It will be appreciated that when the armature 60 is disposed in the position that is illustrated in FIG. 2A, the attractive force exerted by the magnetic field that is generated by the coil 56 can be relatively small as compared to the attractive force exerted when the armature 60 is in the position that is illustrated in FIG. 2B. The configuration of the cam surface 74 permits the movable member 58 to be moved a relatively large distance without significantly increasing the force that acts on the clutch pack 46 (i.e., as the follower 88 moves over the first wall portion 64) and thereafter significantly increases the force that acts on the clutch pack 46 (i.e., as the follower 88 moves over the second wall portion 72) when the armature 60 is relatively close to the coil 56 (so that the force that is exerted on the armature 60 by the magnetic field is relatively large). Construction in this manner permits the friction clutch assembly 42 to be extremely responsive.

It will be appreciated that the actuator assembly 54 can be configured in any suitable fashion. For instance, the current sent to the coil 56 could be of any suitable polarity, and the armature core 60 could be either attracted or repelled when the coil 56 is energized. Furthermore, the actuator assembly 54 could be configured to maintain the movable member 58 in the second position and selectively move the movable member 58 (e.g., by energizing the coil 56) into the first position. It will be appreciated that the distance of over which the movable member 58 is moved to cause the clutch pack 46 to fully engage (or fully disengage) can be tailored to a desired amount. In some embodiments, for instance, the moveable member 58 moves between approximately 1.0 mm to 3.0 mm between the engaged and disengaged positions and more preferably between approximately 1.5 mm to about 2.0 mm.

Another friction clutch assembly constructed in accordance with the teachings of the present disclosure is generally indicated by reference numeral 142. The friction clutch assembly 142 can be substantially similar to the clutch assembly 42 that is illustrated in FIGS. 2A and 2B except as noted.

The friction clutch assembly 142 includes a movable member 58' and an actuator assembly 154 with a linear actuator 155 that is in communication with the controller 143. The linear actuator 155 includes a motor 157. It will be appreciated that the motor 157 could be of any suitable type, such as a hydraulic motor or cylinder with an output member 156 that is drivingly coupled to the movable member 58'. The motor 157 is drivingly coupled to the moveable member 58. It will be appreciated that other types of motors could be employed, including pneumatic or electrically powered motors, and that such motors could have a rotary or linear output. For example, the motor 157 could be a conventional electric motor with a rotary output that is employed to rotate a screw (not shown), such as a lead screw or a ball screw. The screw could be coupled to or formed in the movable member 58' so that the movable member 58' translates in response to rotation of the screw.

With renewed reference to FIGS. 2A and 3A, it will also be appreciated that the dimensions of the lever arms 52 can be adapted according to the desired torque transfer operation of the clutch assembly 42, 142. For instance, the longitudinal length of the base 100, the longitudinal length of the leg 102, the angle between the portion 80 and the second portion 82 of the leg 102, the angle between the base 100 and the leg 102 and/or the location of the pin 84 can be configured as desired in order to change the mechanical advantage provided by the lever arms 52. As such, the amount of force transferred from the lever arms 52 to the clutch pack 46 as the moveable member 58 moves to or from the second position can be changed. Thus, the lever arms 52 can be adapted to transfer force to the clutch pack 46 in a predetermined manner as the moveable member 58 moves to the engaged position.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A clutch comprising:
a first rotary shaft member;
a second rotary shaft member;
a clutch pack having a plurality of first clutch members and a plurality of second clutch members, the first clutch members being coupled to the first rotary shaft member for rotation therewith, the second clutch members being interleaved with the first clutch members and being coupled to the second rotary shaft member for rotation therewith;
a pair of pivot arms, each of the pivot arms having a first portion to which a cam follower is mounted and a second portion, each of the pivot arms being pivotable between a first arm position and a second arm position to change a clamping force applied by the pivot arms to the clutch pack, wherein a clamping force associated with the second arm position is greater than a clamping force associated with the first arm position, each of the pivot arms having a follower; and
an actuator assembly comprising a movable member and a linear motor, the movable member being disposed about the second rotary shaft member and being received between the pivot arms, the movable member defining a cam surface and an interior chamber that is located radially inwardly of the cam surface, the followers being in rolling contact with the cam surface, wherein at least a portion of the linear motor is received in the interior chamber.

2. The clutch of claim 1, wherein the cam surface is generally bell-shaped.

3. The clutch of claim 1, wherein when the pivot arms are in the first arm position, the cam followers contact the cam surface at a first contact point that is defined by a first slope, wherein when the pivot arms are in the second arm position, the cam followers contact the cam surface at a second contact point that is defined by a second slope, the first slope tapering radially outwardly with decreasing distance toward the clutch pack at a first rate, the second slope tapering radially outwardly with decreasing distance toward the clutch pack at a second rate, wherein the second rate is greater than the first rate.

4. The clutch of claim 1, wherein the actuator assembly further comprises a spring that biases the movable member toward the clutch pack.

5. The clutch of claim 4, wherein the spring is received in the interior chamber.

6. The clutch of claim 1, wherein the movable member travels a distance that is less than or equal to 3.0 mm and greater than or equal to 1.0 mm to move the pivot arms from the first arm position to the second arm position.

7. The clutch of claim 6, wherein the distance traveled by the movable member to move the pivot arms from the first arm position to the second arm position is less than or equal to 2.0 mm.

8. The clutch of claim 1, wherein the linear motor comprises an armature and an electromagnetic coil, the armature being coupled to the movable member, the electromagnetic coil being at least partly received in the interior chamber in the movable member.

* * * * *